Figure 1:
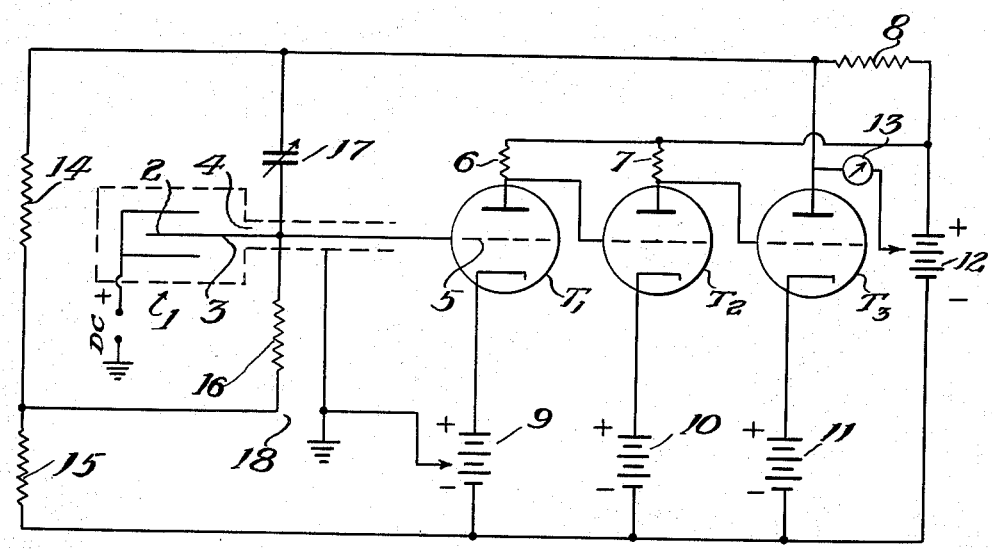

Nov. 11, 1952          B. L. WELLER          2,617,946

RADIATION DETECTOR CIRCUIT

Filed July 7, 1950

INVENTOR:
Barton L. Weller
BY
Roland A. Anderson
Attorney.

Patented Nov. 11, 1952

2,617,946

UNITED STATES PATENT OFFICE 2,617,946

RADIATION DETECTOR CIRCUIT

Barton L. Weller, Richland, Wash., assignor to the United States of America as represented by the United States Atomic Energy Commission Application July 7, 1950, Serial No. 172,546

7 Claims. (Cl. 250—83.6)

The present invention relates to an electrometer circuit, more particularly to a degenerative or inverse feedback, direct current amplifier circuit including an electrometer tube, which circuit is particularly suitable for measuring small currents, such as those developed in a radiation responsive ion chamber. This application is a division of the application, Serial No. 580,044, filed February 27, 1945, for an Amplifier.

In the past, direct current electrometer circuits involving an inverse or negative feedback feature have been used for measuring small currents because of the stability imparted to the circuit, rendering the performance substantially independent of changes in tube characteristics, slow variations in supply voltages, etc., thereby effectively extending the range of indicating and recording instruments although with some sacrifice in the amplification factor of the system. However, transient variations occurring in different portions of such circuits, such as those caused by sudden changes in tube characteristics, or the dropping off of pieces of oxide coating from the cathode, and rapid changes in supply voltages or in the quantity being measured, have given rise to considerable difficulty in obtaining steady and accurate measurements of small ion currents being developed. Many believe that such variations are principally due to the short time constant of the circuit, changes of which are thought to be difficult to detect by ordinary instruments. I found that interpretation to be incorrect because removal of a large resistor in the feedback circuit causes disappearance of this transient instability.

An object of my invention is to provide a degenerative or inverse feedback electrometer circuit that is substantially devoid of transient instability.

A more specific object of my invention is to provide a direct current amplifier, including an electrometer tube, incorporating an inverse feedback circuit that considerably increases the stability when used to measure small currents, such as ion currents developed in a radiation responsive chamber.

Figure 2:
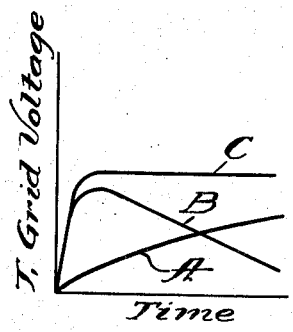
Figure 3:
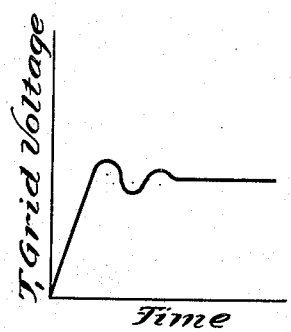
Figure 4:
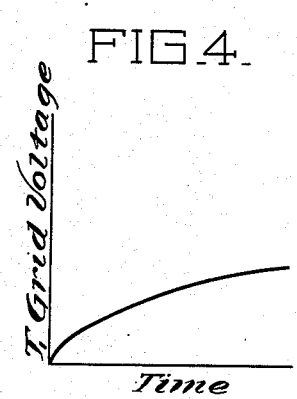

Other objects and advantages will become apparent from the following specification when read in view of the drawing wherein:

Fig. 1 is a schematic circuit diagram of a direct current electrometer circuit incorporating my invention and involving inverse feedback, that is coupled to a radiation responsive ion chamber; and Figs. 2, 3, and 4 are graphs of voltage variations of the electrometer tube grid input plotted against time for three different values of capacity of condenser 17 shown in Fig. 1.

Referring more particularly to Fig. 1, numeral 1 denotes an ion chamber including a cylindrical electrode or anode 2, and a centrally disposed collecting electrode or cathode 3. Chamber 1 is filled with argon or other suitable gas that readily becomes ionized when subjected to radiations, such as gamma radiations, resulting in the development of ions. The ions being positive, are collected by collecting electrode 3 which is maintained by a potential source marked DC at a negative potential with respect to the anode 2, thereby forming an ion current that is subsequently amplified and measured. A guard ring 4 is interposed by insulators (not shown) between the collecting electrode 3 and high potential electrode or anode 2 so as to act as an electrostatic shield to protect the collecting electrode from disturbing effects caused by the high potential difference between electrode 2 and the guard ring 4 and against the possibility of polarization of the collecting electrode insulator. Polarization is the separation of positive and negative charges on such insulator but not sufficiently in extent as to be pulled out of their original atoms or molecules. Guard ring 4, therefore, protects against either surface charges or virtual charges due to polarization of the insulator which would otherwise affect the potential of the collecting electrode 3 and introduce errors in measurement.

An electrometer direct coupled amplifier circuit is provided to amplify the ion currents developed and includes an odd number of stages or electric discharge tubes, $T_1$, $T_2$ and $T_3$, each stage providing a 180° change of phase between the input and output voltages as well as providing amplification. Tube $T_1$ is an electrometer tube having an input grid 5 directly connected to collecting electrode 3 of the ion chamber 1. Tubes $T_1$, $T_2$, and $T_3$, preferably of the electronic triode type as shown, are directly coupled as indicated and are provided with suitable anode resistors 6, 7, and 8 as well as a plurality of bias batteries 9, 10, and 11, the latter having values of 4 to 10 volts, for example. A battery 12 having a voltage of around 90 volts provides the plate voltage across the output of tube $T_3$. A microam 13 is provided in the output circuit for measuring output currents which are indicative of the radiation intensities falling on ion chamber 1. A tap on battery 12 is adjusted so that the plate voltage of tube $T_3$ will be neutralized and cause no current flow through meter 13 for zero signal from chamber 1.

A high impedance or resistor 16 having a value, for example, of $10^{11}$ ohms, is connected directly to the collecting electrode 3 and input grid 5 and between these electrodes and the plate of tube T₃ and battery 9 through resistors 14 and 15 respectively. Thus the output voltage of tube T₃ is applied across resistors 14 and 15 which effectively form a voltage divider with an intermediate tap to the resistor 16. Resistors 14 and 15 may be of the order of $10^3$ ohms. Thus it will be seen that by suitably adjusting the ratios of resistors 14 and 15 a definite fraction of the output voltage may be fed through resistor 16 to the input grid 5. The voltage of input grid 5 varies with the voltage across resistor 16 which in turn varies with changes in ion current flow through chamber 1. The inverse feedback principle dictates that the voltage of point 18, that is the tap point of resistors 14 and 15, changes in a direction to oppose a change in voltage across resistor 16 created by ionization currents from ion chamber 1. This action results from the condition that the input grid changes in potential only $$\frac{1}{KG+1}$$

times the change in voltage across resistor 16, where G is the overall gain of the entire amplifier circuit and K is the proportion of the output voltage fed into the input. As G is usually 1000 or more, the change in the potential of grid 5 is relatively small. In order to reduce the long time constant inherent with such high impedance 16, the guard ring 4 is returned to a constant potential source at substantially the same potential at that of the input grid, such as may be effected by connecting the guard ring to a grounded negative terminal of bias battery 9. The guard ring 4 is thus slightly negative in potential with respect to the cathode of tube T₁. Since the inverse feedback operation allows grid 5 to vary only a small amount, such as of the order of less than $\frac{1}{1000}$ volt the change of potential across the grid-to-guard capacity is much smaller than the change across the high resistor 16. The charging time is, therefore, reduced and the time constant of the circuit is shortened and thereby improved. This desirable arrangement, however, detracts from satisfactory feedback operation because the grid-to-guard capacity and the high impedance resistor 16 do not allow the feedback to act instantaneously. Thus the feedback cannot operate for fast variations, hence the full gain of the amplifier carries these variations to the output meter 13.

One method of preventing this condition is to by-pass the high resistor 16 with some capacity. This arrangement, however, is undesirable because the time constant is increased in the same proportion as the impedance and stability is reduced. Another method is to supply some feedback through the grid-to-guard capacity by supplying some feedback voltage to the guard ring 4. This method is an improvement but does not completely solve the problem unless the guard ring is returned to the same point or voltage value as the high resistor 16. By this method many of the advantages of the low time constant are lost because the grid-to-guard capacity has to be charged to the full input potential.

In accordance with my invention, as shown in Fig. 1, voltage transient effects are eliminated by providing a parallel impedance circuit in the inverse feedback network, which circuit comprises a pair of parallel paths, one of which includes a small variable condenser 17 having a capacity, for example, between 1 and 10 mmf., and the other parallel path includes the high value resistor 16. Without such condenser 17, the high impedance of the resistor 16 and the inherent input capacity including the grid-to-guard capacity would be effective to prevent the feedback from responding to rapid voltage variations in the circuit or to higher frequency components of such variations, particularly those above 5 cycles per second.

Fig. 2, curve A shows the relatively slow change in the value of grid voltage of tube T₁, exclusive of the effects of condenser 17, due to the relatively high time constant provided by the high value of resistor 16 and the grid-to-guard capacity. It will be noted that condenser 17 by virtue of its direct connection to the plate of the output tube T₃ will receive feedback voltage of substantially greater amplitude than the reduced feedback voltage fed through the resistor 16, perhaps over four times as large. Hence, as indicated by curve B of Fig. 2, which shows variations in value of grid voltage of tube T₁ due solely to the condenser 17, the grid voltage instantaneously rises to a relatively high value and will afterwards gradually decrease due to the subsequent discharge of condenser 17 through resistors 16 and 14. By properly selecting the value of the capacity of condenser 17, generally between 1 and 10 mmf., it is possible to get an optimum curve C shown in Fig. 2, which is the resultant of curves A and B and represents the resultant grid voltage change from the circuit as illustrated in Fig. 1. Such optimum curve C is one that substantially instantaneously assumes a predetermined value and maintains that value during the period that condenser 17 discharges and the grid-to-guard capacity is charged. The value of the condenser 17, therefore, is critical because if the capacity is too large, that is, if it is substantially greater than 10 mmf., the peak of curve B of Fig. 2 will be greater, and the resultant curve will assume the shape shown in Fig. 3, which shows a disturbing transient voltage due to the underdamped condition existing. On the other hand if the value of condenser 17 is too small, the peak of curve B of Fig. 2 will likewise be small resulting in a grid voltage, such as shown in Fig. 4, which is illustrative of an over-damped condition resulting in sluggish and undesirable operation. The improvement in the time constant by using condenser 17 is about 1000 fold.

It will be seen by virtue of the higher amplitude or swing of feedback voltage applied to condenser 17, that this condenser can be relatively small and still allow the input grid 5 to be driven in spite of the grid-to-guard capacity and to respond to rapid voltage changes or so-called "first derivative changes" of voltage, particularly those above 5 cycles per second. In this manner rapid change occurring in any part of the circuit will be rapidly reflected and compensated for by the feedback circuit. Thus it will be seen that rapid voltage fluctuations particularly above 5 cycles per second will be by-passed to the grid 5 by condenser 17, whereas slow fluctuations in voltage, mainly below about 5 cycles per second will be transferred to grid 5 through resistor 16.

Since the condenser 17 is of small capacity, it can be included without introducing appreciable additional leakage paths in the electrometer circuit. Condenser 17 being small can be mounted on parts that already exist in the circuit, such as the lead-in to input grid 5, and may be in the form of an air condenser or in the form of a cable of variable length.

Best operation is obtained insofar as stability is concerned when either no external current or a very small external current from the ion chamber 1 flows through the high resistor 16. High values of ion current flowing through the high value resistor 16 have a tendency to give rise to a small degree of voltage transients.

Three stages of amplification have been illustrated in Fig. 1. It should be noted that any number of odd stages may be used instead, and further that the feedback voltage may be fed from any of the latter odd stages, not necessarily the last stage. Furthermore, while the electrometer feedback has been described in connection with a radiation measuring device, it should be noted that such circuit is likewise adaptable to any other circuit where small input currents are to be measured or detected. Other alternate arrangements likewise may be readily suggested to those skilled in the art after having had the benefit of the teachings of my invention. For this reason, the invention should not be limited except insofar as set forth in the following claims.

I claim:

1. A radiation measuring device including an ion chamber and a degenerative direct current amplifier therefor including an electrometer input tube, an amplifying output tube, and a degenerative circuit interconnecting the plate of said output tube and the grid of said input tube, said degenerative circuit including parallel impedance paths, one of said paths including solely a high resistance and the other path including solely a small capacity condenser.

2. A radiation measuring device including an ion chamber having a central collecting electrode, a surrounding cylindrical electrode and a guard ring therebetween having a potential applied thereto substantially equal to that of said collecting electrode; and an amplifier including an input element connected to said collecting electrode and an output element, and an impedance circuit having parallel impedance paths interconnecting said input and output elements, one of said impedance paths including solely a small capacity condenser.

3. A radiation measuring device including an ion chamber having a central collecting electrode, a surrounding cylindrical electrode and a guard ring therebetween having a potential applied thereto substantially equal to that of said collecting electrode; and an inverse feedback amplifier having an odd number of stages including an electrometer tube input stage and an amplifying tube output stage, said electrometer tube having a grid connected to said collecting electrode, said output amplifying tube including a plate, and a feedback circuit interconnecting said plate and said input grid and including a pair of parallel impedance paths, one of said paths being predominantly capacitative.

4. A radiation measuring device including an ion chamber having a central collecting electrode, a surrounding cylindrical electrode, and a guard ring therebetween having a potential applied thereto substantially equal to that of said collecting electrode; and an inverse feedback amplifier having an odd number of stages including an electrometer tube input stage and an amplifying tube output stage, said electrometer tube having a grid connected to said collecting electrode, said output amplifying tube including a plate, and a feedback circuit interconnecting said plate and said input grid and including a pair of parallel impedance paths, one of said paths including a resistor of the order of $10^{11}$ ohms and the other including solely a condenser having a capacity between 1 and 10 mmf.

5. The method of operating a radiation measuring device comprising an ion chamber including a collecting electrode, guard ring and cylindrical electrode, and a degenerative amplifier including input and output terminals, said method comprising feeding substantially the full amplitude of output voltage at said output terminal to said input through a circuit that contains solely a condenser, reducing said output voltage to a voltage of substantially lower amplitude, and feeding the reduced voltage also to said input terminal through a separate high impedance circuit exclusive of said condenser.

6. An electrometer type direct current amplifier including an ion chamber, an electron tube and a negative feedback circuit for maintaining the grid voltage of said electron tube substantially independent of variations in the amplification factor, a high resistance grid return path through which a portion of the feedback voltage of low frequency variation is applied to the grid of said electron tube, a separate grid return path exclusive of said resistor and including a variable condenser for by-passing variations of feedback voltage of a frequency greater than 5 cycles per second to said grid, and circuit means for energizing said separate grid return path by a feedback voltage portion greater than said first mentioned feedback voltage portion.

7. Radiation measuring apparatus comprising, in combination, a series ionization chamber circuit comprising an ionization chamber, a voltage supply, an impedance adapted to develop a voltage proportional to the current through the ionization chamber, and a second impedance, amplifying means connected across both of said impedances, and means responsive to said amplifying means for developing across said second impedance a voltage at least partially balancing any change in voltage across the first impedance.

BARTON L. WELLER.

REFERENCES CITED

The following references are of record in the file of this patent:

UNITED STATES PATENTS

| Number | Name | Date |
|---|---|---|
| 2,481,964 | Wollan | Sept. 13, 1949 |
| 2,536,617 | Weller | Jan. 2, 1951 |

OTHER REFERENCES

"Balanced Feed-Back Amplifiers," Ginzton, Pro. of the Institute of Radio Engineers, vol. 26, No. 11, November 1938, pages 1367–1379.